US008116167B2

(12) United States Patent
Johnson et al.

(10) Patent No.: US 8,116,167 B2
(45) Date of Patent: Feb. 14, 2012

(54) METHOD AND SYSTEM FOR GENERATING A BEAM OF ACOUSTIC ENERGY FROM A BOREHOLE, AND APPLICATIONS THEREOF

(75) Inventors: Paul A. Johnson, Santa Fe, NM (US); James A. Ten Cate, Los Alamos, NM (US); Robert Guyer, Reno, NV (US); Pierre-Yves Le Bas, Los Alamos, NM (US); Cung Vu, Houston, TX (US); Kurt Nihei, Oakland, CA (US); Denis P. Schmitt, Katy, TX (US); Christopher Skelt, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 292 days.

(21) Appl. No.: 12/137,980

(22) Filed: Jun. 12, 2008

(65) Prior Publication Data

US 2009/0310441 A1    Dec. 17, 2009

(51) Int. Cl.
*G01V 1/50* (2006.01)
*G01V 1/44* (2006.01)
(52) U.S. Cl. .......... 367/32; 367/25; 181/104; 73/152.02
(58) Field of Classification Search ............... 367/25, 367/31, 32, 86; 181/104, 105; 73/152.02
See application file for complete search history.

(56) References Cited

U.S. PATENT DOCUMENTS

| | | | | |
|---|---|---|---|---|
| 3,732,945 | A | * | 5/1973 | Lavigne ................ 367/189 |
| 3,974,476 | A | | 8/1976 | Cowles |
| 4,509,149 | A | * | 4/1985 | Ruehle ................ 181/104 |
| 4,646,565 | A | * | 3/1987 | Siegfried ............... 181/105 |
| 5,144,590 | A | * | 9/1992 | Chon ..................... 367/57 |
| 5,521,882 | A | | 5/1996 | D'Angelo |
| 6,009,043 | A | | 12/1999 | Chon et al. |
| 6,175,536 | B1 | * | 1/2001 | Khan ..................... 367/32 |
| 6,704,247 | B1 | * | 3/2004 | Ruffa ..................... 367/92 |
| 7,301,852 | B2 | | 11/2007 | Leggett, III | |

FOREIGN PATENT DOCUMENTS

| | | | |
|---|---|---|---|
| GB | 2404983 A | | 2/2005 |
| SU | 913303 | * | 3/1982 |

OTHER PUBLICATIONS

Johnson et al, "Nonlinear Generation of Elastic waves in Granite and Sandstone: Continuous Wave and Travel Time Observations", Journal of Geophysical Research, vol. 94, No. B12, pp. 17729-17733, Dec. 10, 1989.*

(Continued)

*Primary Examiner* — Ian Lobo
(74) *Attorney, Agent, or Firm* — Pillsbury Winthrop Shaw Pittman LLP

(57) ABSTRACT

A compact array of transducers is employed as a downhole instrument for acoustic investigation of the surrounding rock formation. The array is operable to generate simultaneously a first acoustic beam signal at a first frequency and a second acoustic beam signal at a second frequency different than the first frequency. These two signals can be oriented through an azimuthal rotation of the array and an inclination rotation using control of the relative phases of the signals from the transmitter elements or electromechanical linkage. Due to the non-linearity of the formation, the first and the second acoustic beam signal mix into the rock formation where they combine into a collimated third signal that propagates in the formation along the same direction than the first and second signals and has a frequency equal to the difference of the first and the second acoustic signals. The third signal is received either within the same borehole, after reflection, or another borehole, after transmission, and analyzed to determine information about rock formation. Recording of the third signal generated along several azimuthal and inclination directions also provides 3D images of the formation, information about 3D distribution of rock formation and fluid properties and an indication of the dynamic acoustic non-linearity of the formation.

19 Claims, 19 Drawing Sheets

OTHER PUBLICATIONS

Johnson et al, "Nonlinear Generation of Elastic waves in Crystalline Rock", Journal of Geophysical Research, vol. 92, No. B5, pp. 3597-3602, Apr. 10, 1987.*

Johnson et al., "Nonlinear Generation of Elastic Waves in Crystalline Rock", Journal of Geophysical Research, vol. 92, No. B5, Apr. 10, 1987, pp. 3597-3602.

International Search Report and Written Opinion for PCT International Patent Application No. PCT/US2009/047184, mailed Dec. 21, 2009.

International Preliminary Report on Patentability for PCT International Patent Application No. PCT/US2009/047184, mailed Dec. 23, 2010.

* cited by examiner

EXPERIMENTAL SET UP

BOREHOLE

MIXING VOLUME= $\pi a^2 L_T$
$\varsigma = k_- L$
$k_- = k_2 - k_1$

| COLUMN # | TRANSDUCER # AND PHASE DIFFERENCE |
|---|---|
| 1 | $1: f_1, 0°$ |
| 2 | $2: f_1, \Delta\varphi$     $3: f_2, 0°$ |
| 3 | $4: f_1, 2\Delta\varphi$    $5: f_2, \Delta\varphi$ |
| 4 | $6: f_1, 3\Delta\varphi$    $7: f_2, 2\Delta\varphi$ |
| 5 | $8: f_2, 3\Delta\varphi$ |

$f_1 = 60$ kHz $f_2=65$ kHz $f_2 - f_1 = 5$ kHz $f_1$=60 kHz

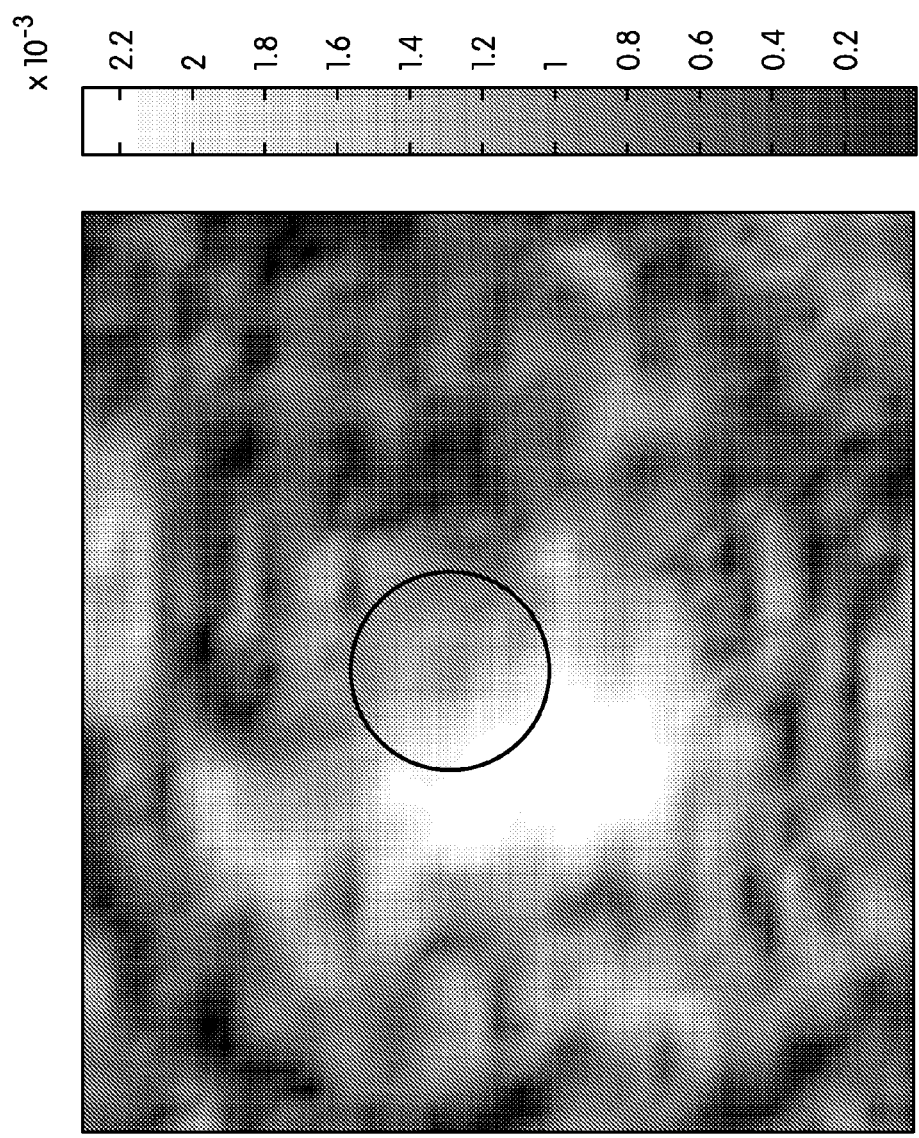
FIG. 8B (B): $f_2=65$ kHz $f_2 - f_1 = 5$ kHz

METHOD AND SYSTEM FOR GENERATING A BEAM OF ACOUSTIC ENERGY FROM A BOREHOLE, AND APPLICATIONS THEREOF

GOVERNMENT RIGHTS

This invention was made with Government support under Cooperative Research and Development Agreement (CRADA) Contract Number DE-AC52-06NA25396 awarded by the United States Department of Energy. The Government may have certain rights in this invention.

FIELD

The present invention relates generally to acoustic interrogation of rock formations around a borehole and more particularly to using the combination of an acoustic source including a single transducer or an array of transducers in the wellbore and the acoustically non-linear near wellbore rock formation as the source of an acoustic beam.

BACKGROUND

Acoustic interrogation of subsurface features tend to be limited by the size and power of practical sources, and in practice, the output of downhole acoustic transducers is limited by the power transmission capabilities of the wire line cable. High frequency signals have a relatively short penetration distance, while low frequency signals generally require large sources, clamped to the borehole wall, to maximize energy transfer to the formation and minimize unwanted signals within the well bore. Attempts have been made to produce such a low frequency signal, but each has had its own shortcomings. For example, U.S. Pat. No. 5,521,882 by D'Angelo et al. discloses an acoustic tool designed to record non-linear waves that propagate along the borehole wall and refract back into the well, with limited penetration onto the surrounding rock formation. U.S. Pat. No. 7,301,852 by Leggett, III et al. discloses using a bottom hole assembly having an array of transducers located in opposite ends of the assembly to produce the signals that converge at an angle, as reported by Johnson et al (1987). The signals from non-linear mixing at an angle are extremely weak and diffuse, and would not penetrate deep into the surrounding rock formation. In light of these prior attempts, there is a need for an acoustic signal source that can produce low frequency energy from the borehole in the subsurface environment.

SUMMARY

In accordance with an aspect of the invention, a method of generating a beam of acoustic energy in a rock formation penetrated by a borehole is provided. The method comprises generating a first acoustic signal at a first frequency; generating a second acoustic signal at a second frequency different from the first frequency, wherein the first acoustic signal and second acoustic signal are generated by an array of transducers located within the borehole; transmitting the first and the second acoustic signals into an acoustically non-linear portion of the rock formation outside of the borehole; combining the first and the second acoustic signals by a three wave mixing process to generate a collimated third signal in the rock formation, wherein the collimated third signal propagates through the rock formation in a same direction as an initial direction of the first and the second acoustic signals and has a frequency equal to a difference of the first and the second acoustic signals and an amplitude dependent on a non-linear property of the rock formation; receiving the third signal at one or more receivers after it has reflected or back-scattered from an inhomogeneity in the formation; and analyzing the received signal to determine information about the rock formation.

In accordance with an aspect of the invention, a system for determining information about a rock formation penetrated by a borehole is provided. The system comprises one or more transducers configured to generate a first acoustic signal at a first frequency and generate a second acoustic signal at a second frequency different from the first frequency; one or more receivers in communication with the one or more transducers, the receivers configured to detect through the rock formation a third signal that results from the interaction of the first and the second acoustic signals in region of the rock formation outside the borehole, wherein the detected third signal is detected after passing through a portion of the rock formation and a processor programmable with machine executable instructions for analyzing the received signal to determine information about the rock formation.

In accordance with an aspect of the invention, a system for characterizing a non-linear property of a rock formation penetrated by a first borehole is provided. The system comprises one or more transducers configured to generate a first acoustic signal at a first frequency and generate a second acoustic signal at a second frequency different from the first frequency, wherein the array is arranged in the first borehole; one or more receivers, arranged in a second borehole, and in communication with the one or more transducers, the receivers configured to detect through the rock formation a third signal that results from the interaction of the first and the second acoustic signals in region of the rock formation outside the first borehole, wherein the detected third signal is detected after traveling through a portion of the rock formation and reflecting from an inhomogeneity; and a processor programmable with machine executable instructions for analyzing the received signal to determine information about the rock formation in the non-linear interaction region between the first and the second boreholes.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 8b shows how steering the primaries results in a steered beam at the difference frequency.

DETAILED DESCRIPTION

Figure 1:
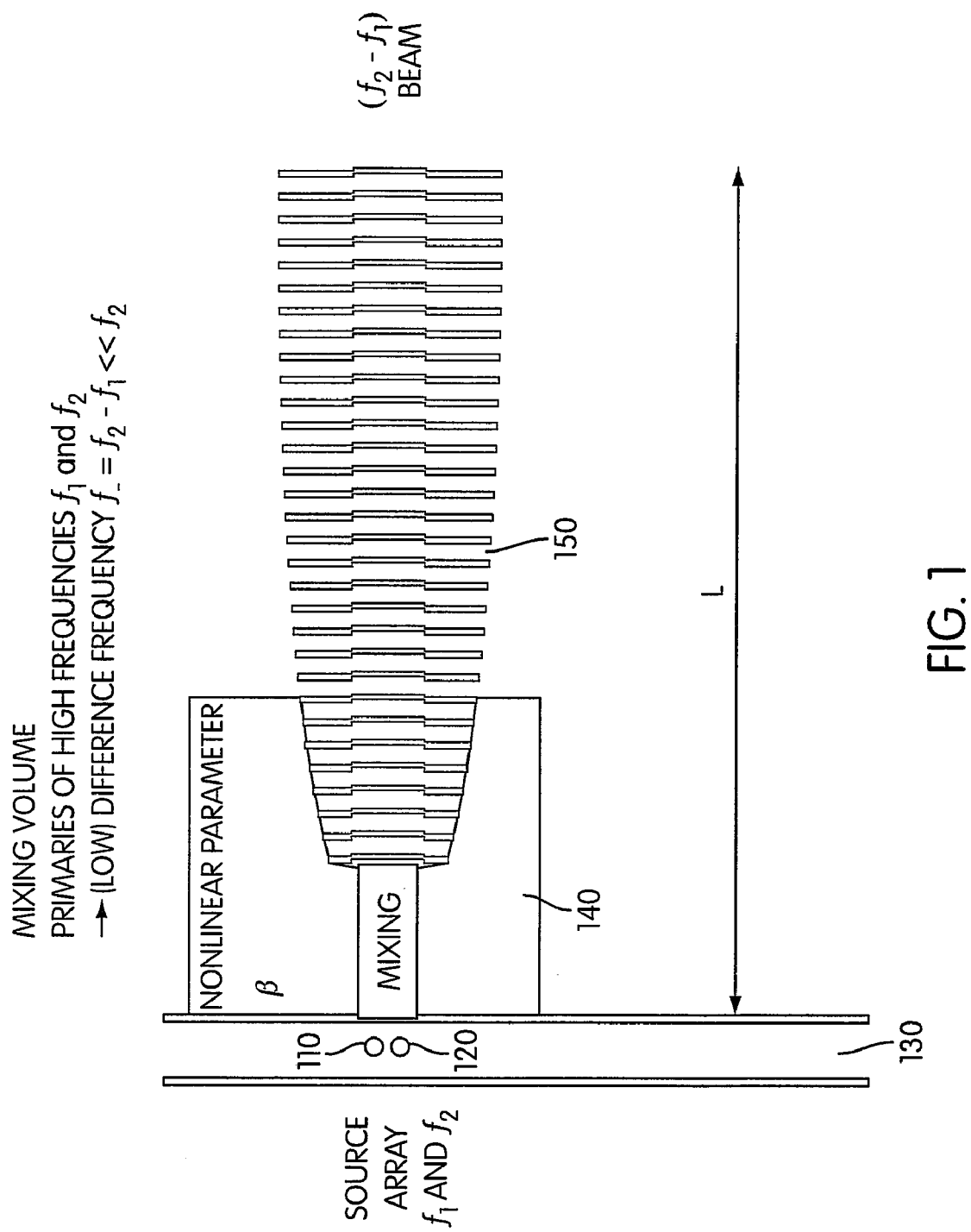
FIG. 1 generally shows how the three wave mixing phenomenon for P-waves in the presence of a borehole occurs, in which two incident waves at two different frequencies, $f_1$ and $f_2$ are emitted in the formation and, as a result of the non-linear properties of the formation, lead to the generation of a third wave with a low frequency of $f_-=f_2-f_1$.

In an embodiment, an array of transducers is used to generate an acoustic beam in the non-linear rock formation around the borehole via a three-wave mixing phenomenon by mixing two collimated primary acoustic signals of higher frequency, as illustrated in FIG. 1. The two collimated primary acoustic signals 110, 120 can be generated over a wide range of higher frequencies by a compact array since high frequency sources can readily fit inside a borehole 130. The non-linearity of the rock formation 140 around the borehole leads to the generation of a collimated acoustic beam 150, commonly referred to as a parametric array beam, having a frequency equal to the difference between the primary acoustic signals and with sufficient strength to propagate a considerable distance into the rock formation. As shown, the high frequency sources are distributed in a plane parallel to the axis of the borehole. The primary sources can be of several types, depending on the application, such as a monopole source (i.e., isotropic radiation) or a dipole source (i.e., equivalent to point forces), or a collection of monopole baffled sources clamped to the borehole wall, or fixed to a tool located within the borehole.

The non-linear behavior of a formation may be characterized through the analysis of the properties of P-waves resulting from the three wave mixing phenomenon in which two incident waves at two different frequencies, $f_1$ and $f_2$, mix to generate third frequency components at the harmonics and intermodulation frequencies $f_2-f_1$, $f_2+f_1$, $2f_1$ and $2f_2$, etc. In an aspect of the invention, the three wave collinear mixing phenomenon is designed to occur in the vicinity of a wellbore. Only the resulting third wave of difference frequency $f_2-f_1$ is of interest to this application. The third wave may be recorded by one or more receivers located in the same or another wellbore. This arrangement is illustrated in FIG. 1 where the generation of the third wave having the difference frequency is shown produced by two primary sources.

In the instance where the primary sources are arranged as a monopole baffled sources, the sources are rigidly baffled in the plane of the array and can be in contact with the borehole wall. Within the transducer array, some sources or transducers are driven at one frequency $f_1$, while others are simultaneously driven at another frequency $f_2$. Adjacent to the wellbore, a low frequency ($f_-=f_2-f_1$) wave is created by nonlinear mixing in the formation of the two high frequency primaries. $\beta$ is the nonlinear parameter that characterizes the nonlinear relationship between the stress and the strain and, for example, in one dimension, appears in the equation $\sigma=K\epsilon(1+\beta\epsilon+\ldots)$, where $\sigma$ is the applied stress, K the bulk modulus and $\epsilon$ the strain. $\beta$ typically ranges from 200 to 1000 for rocks. The volume in which the third wave is created is given by $V_-=\pi a^2 L_T$, where a is a radius encompassing the sources and $L_T$ is a length related to the attenuation of these frequencies. It should be noted that the attenuation (or absorption) length $L_\alpha$, of a wave characterizes a decrease to 1/e of the amplitude, is well known by those versed in the art and is given by $$L_\alpha = \frac{Qc}{2\pi f}, \quad (1)$$

where f is the frequency (Hz), Q is the quality factor and c is the wave velocity (m/s). $L_T$ is the total attenuation length expressed as $L_T^{-1}=L_1^{-1}+L_2^{-1}\approx 2L_2^{-1}$.

The difference frequency signal is generated and propagates from the volume $V_-$, to a receiver or receiver array in the same borehole by reflection from interfaces with contrasting acoustic impedance, or by backscatter from inhomogeneities, or by transmission to a second borehole. The propagation occurs in a collimated beam, the width of which is determined by $k_-L_T$, where k is the wave number of the third wave: $k_-=k_2-k_1=2\pi(f_2-f_1)/c$.

Another length of interest is the so called Rayleigh distance, $L_R$, that defines the limit between the near field and the far field regions of the beam:

$$L_R = \frac{1}{2}ka^2 = \frac{\pi f_p}{c}a^2, \quad (2)$$

where k is the wave number, i.e. $k=2\pi f_p/c$ and $\alpha$ is the radius of the source. The frequency $f_p$ refers to the primaries. The near field region corresponds to a distance $L_x$ less than $L_p$. In this region, the beam is unchanged in size. In the far field region, i.e. for $L_x>L_p$, the beam amplitude decays as $L_p/L_x$, which is the beam spreading factor.

Figure 2:
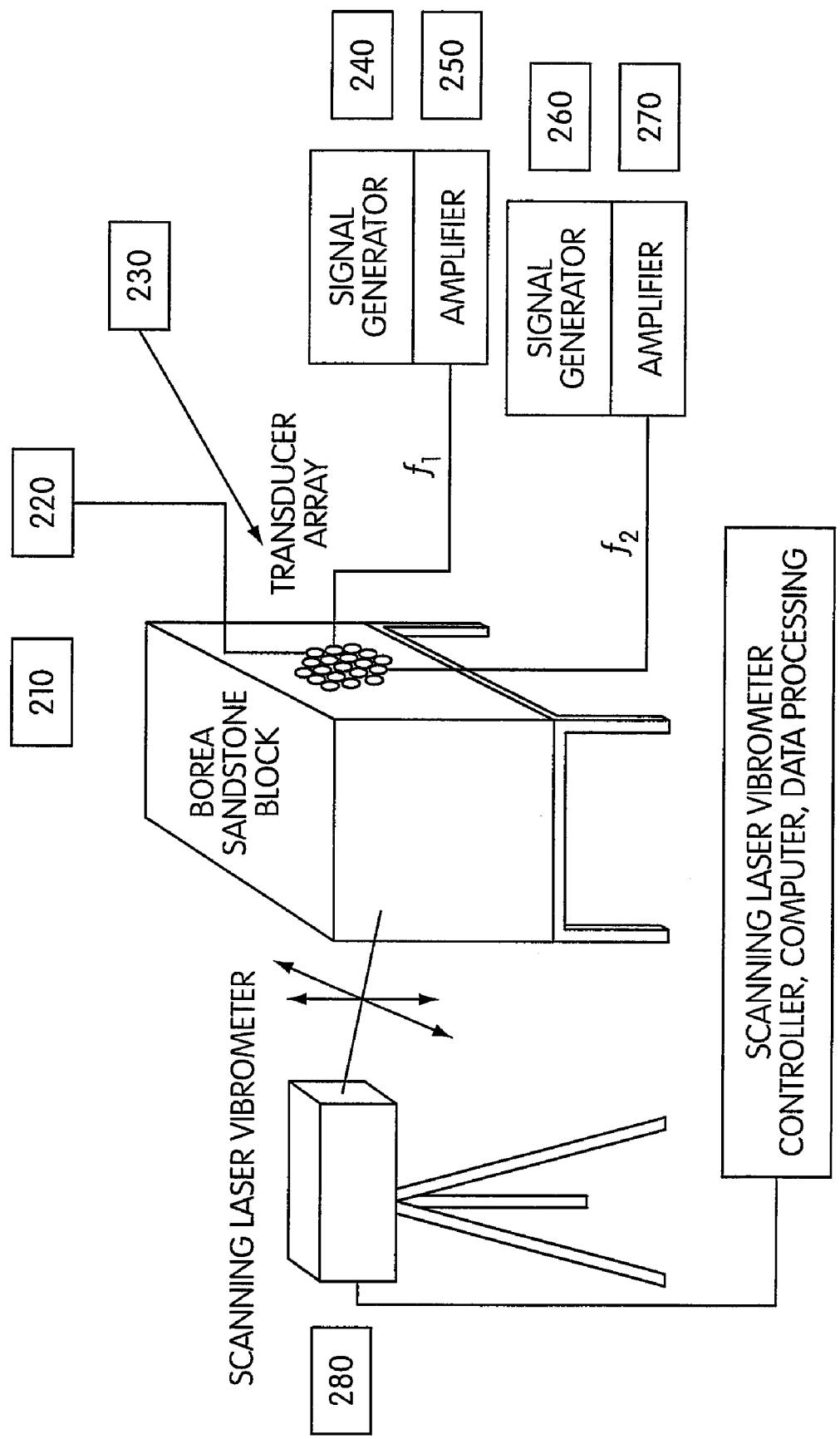
FIG. 2 shows an experimental test design set-up in accordance with an aspect of the invention.

FIG. 2 shows an experimental test design set-up in accordance with an aspect of the invention. In the set-up, the dimensions of a block of Berea sandstone 210 were 1.8 m×0.4 m×0.4 m. The individual sources 220 that comprise the array 230 are 2.5 cm in diameter, arranged within a circle of 6 cm radius. Half of the sources were excited with a frequency $f_2=43$ kHz and the other half with a frequency $f_1=38$ kHz. The third wave then had a frequency $f_-=43$ kHz-38 kHz=5 kHz.

Each of the sources 220 having a frequency $f_1$ are driven by a signal generator 240 that is configured to generate a signal at a frequency $f_1$ and an amplifier 250. Similarly, each of the sources 220 having a frequency $f_2$ are driven by a signal generator 260 that is configured to generate a signal at a frequency $f_2$ and an amplifier 270. The motions at the difference frequency were detected with a laser vibrometer 280 located on the opposite side of the block of Berea sandstone 210, ensuring that there was no possible electronic interference in the strain measurement.

Figure 3A:
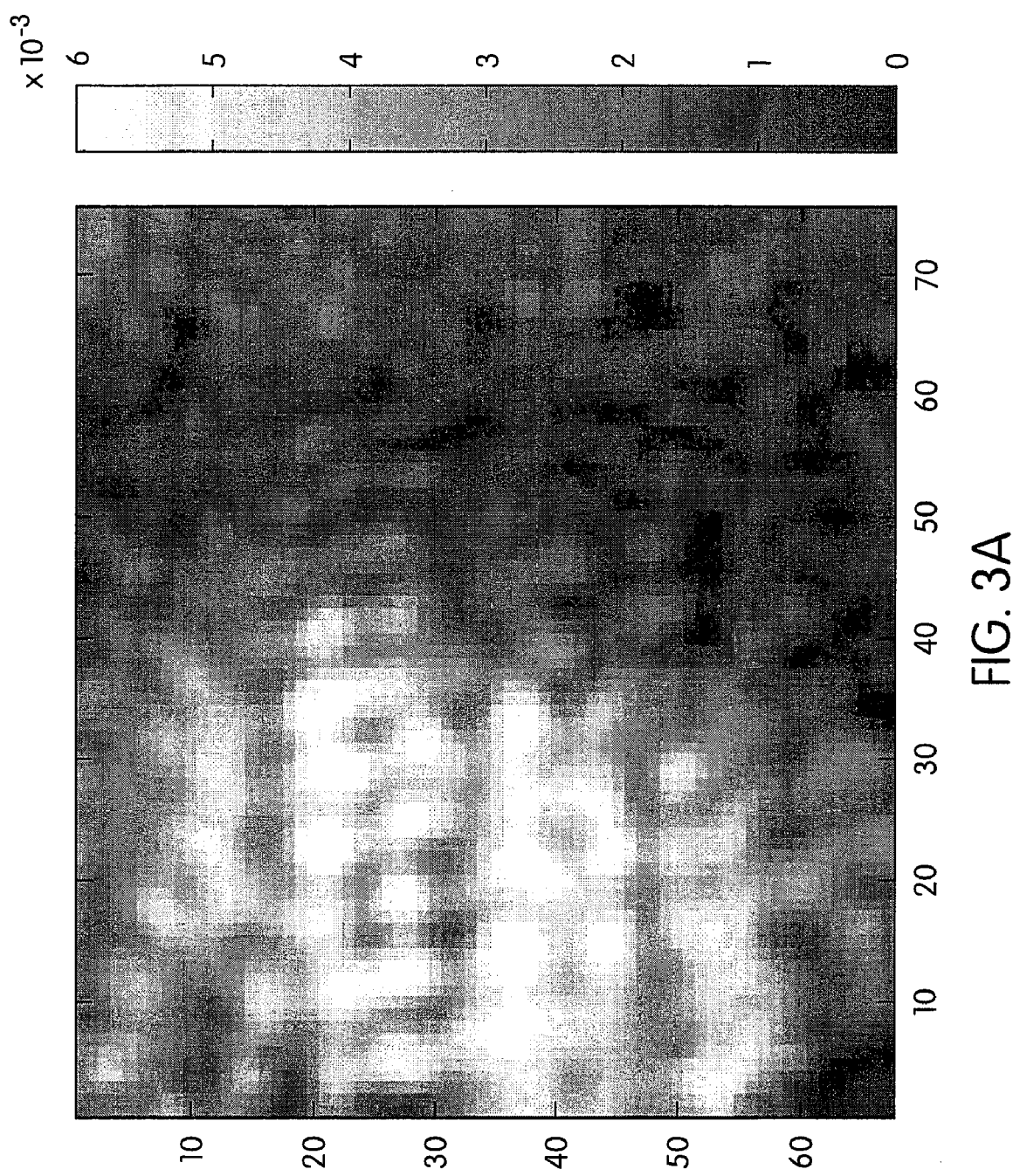
FIGS. 3a, 3b and 3c show some results from the experimental test design set-up of FIG. 2, illustrating the clear coherent 5 kHz beam signal generated by mixing two primary beams with frequencies 38 and 43 kHz.
Figure 3B:
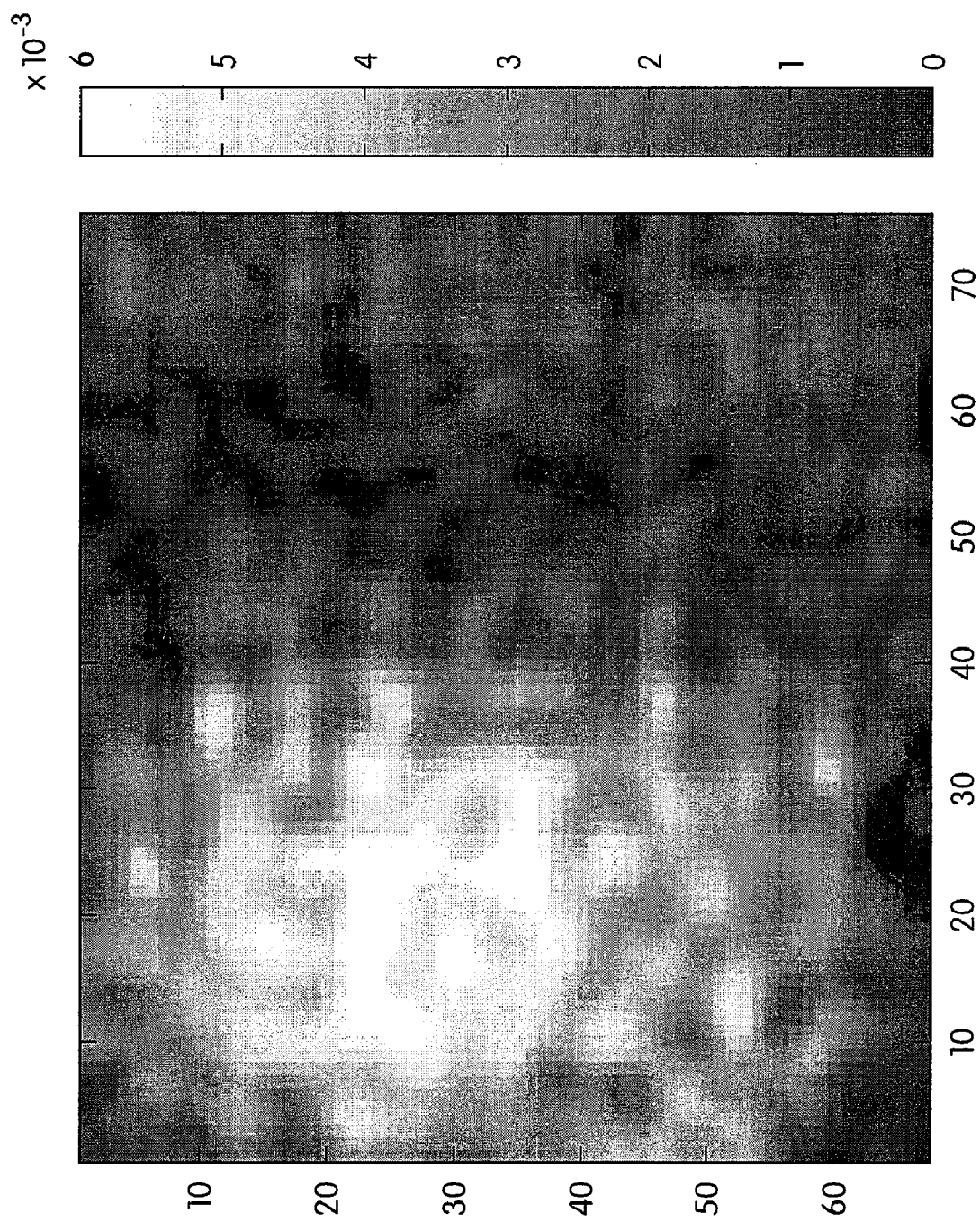
Figure 3C:
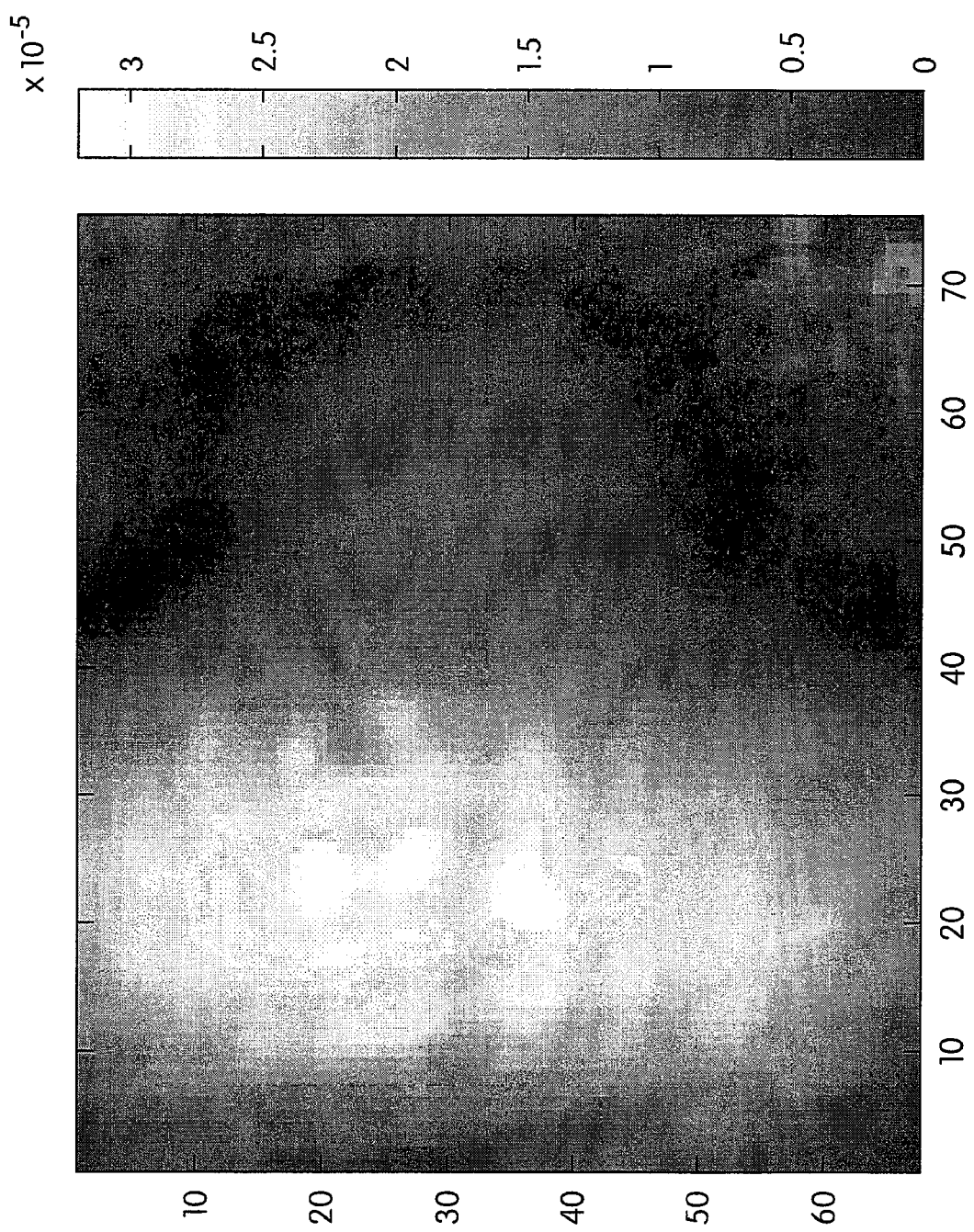

FIGS. 3a, 3b and 3c are a series of strain maps at three frequencies for the set-up of FIG. 2, corresponding to the primary frequencies and the difference frequency, recorded with the laser vibrometer 280. In particular, FIG. 3a shows a primary signal at 43 kHz and FIG. 3b shows another primary signal at 38 kHz. FIG. 3c shows the third signal of frequency 5 kHz resulting from parametric array effect of the non-linear mixing of the two primaries. As is seen in FIG. 3c, this third signal has inherited the collimated properties of the primaries. For the laboratory experiment, using a quality factor of 50 and a wave velocity of 2000 m/s, the attenuation length for the two primaries is 0.37 m and 0.42 m (respectively for 43 kHz and 38 kHz), while it is 3.2 m for the third wave. The Rayleigh distance, with a source radius of 6 cm, is roughly equal to 0.2 m. This demonstrates that the strain measurements were made in the far field region.

Figure 4:
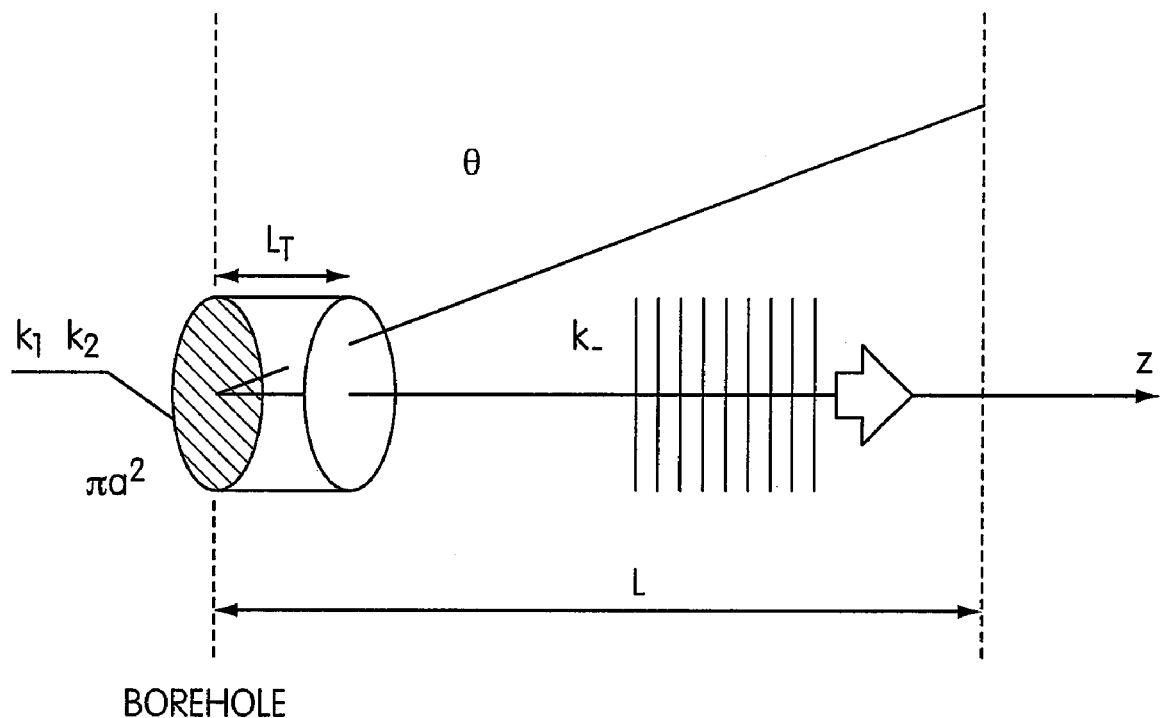
FIG. 4 shows the geometry of the source located at a borehole and the mixing region located outside the borehole where the signals from the sources mix.

FIG. 4 shows the geometry of the source located within a borehole and the mixing region outside the borehole where the signals from the sources are coupled. The strength of the difference ($f_2-f_1$) beam source and the focusing effect of the beam depend on the strengths of the primary sources $f_1$ and $f_2$, the non-linear properties of the rock formation surrounding the borehole and the wave numbers of the primary source and resulting difference frequency. In FIG. 4, $k_1$ and $k_2$ are the wavenumbers associated with the primary frequencies $f_1$ and $f_2$, respectively. $k\_$ is the wavenumber associated with the third wave of frequency ($f_2-f_1$) generated by nonlinear mixing in the formation. The angle $\theta$ is counted from the horizontal which corresponds to $\theta=0$ and corresponds to the azimuth direction relative to the borehole. The primary source are considered to be distributed in a circle of radius $\alpha$.

A dimensionless equation for the strain field at the receiver borehole associated with the third wave, denoted by $\epsilon\_$, can be determined from $$\varepsilon_- \approx \underbrace{\beta\varepsilon_1\varepsilon_1(k\_a)^2}_{(1)} \underbrace{\frac{e^{-s/Q}}{S}}_{(2)} D_A(k\_a\tan\theta)D_W(k\_L_T(\tan\theta)^2), \quad (4)$$

wherein $\beta$ is the nonlinear parameter of the formation, $\zeta$ is equal to $k\_L$, where $k\_=k_2-k_1$ and L is the borehole separation. $\epsilon_1$ and $\epsilon_2$ are the strains at frequencies $f_1$ and $f_2$, respectively. The functions $D_A$ and $D_W$ (of the angle theta measured from the beam axis) are directivities that arise from the finite width a, and length $L_T$ of the source respectively. The directivity $D_A$ is given by:

$$D_A(\theta) = \frac{2J_1(k\_a\tan\theta)}{k\_a\tan\theta}, \quad (5)$$

where $J_1$ is the Bessel function of order 1 with $D_A(0)=1$.

The directivity $D_W$ due to Westervelt) is given by:

$$D_W(\theta) = \sqrt{\frac{1}{1+x_W^2}}, \quad (6)$$

$$x_W = \frac{k\_L_{source}}{2}\tan^2\theta, \quad (7)$$

Usually, $L_{source}$ is the attenuation length $L_T$ so that $$x_W = \frac{Qk\_}{4k_1}\tan^2\theta, \quad (8)$$

Note that similarly to $D_A$, $D_W(0)=1$, (namely the directivity factor is a maximum on-axis of the beams).

Figure 5:
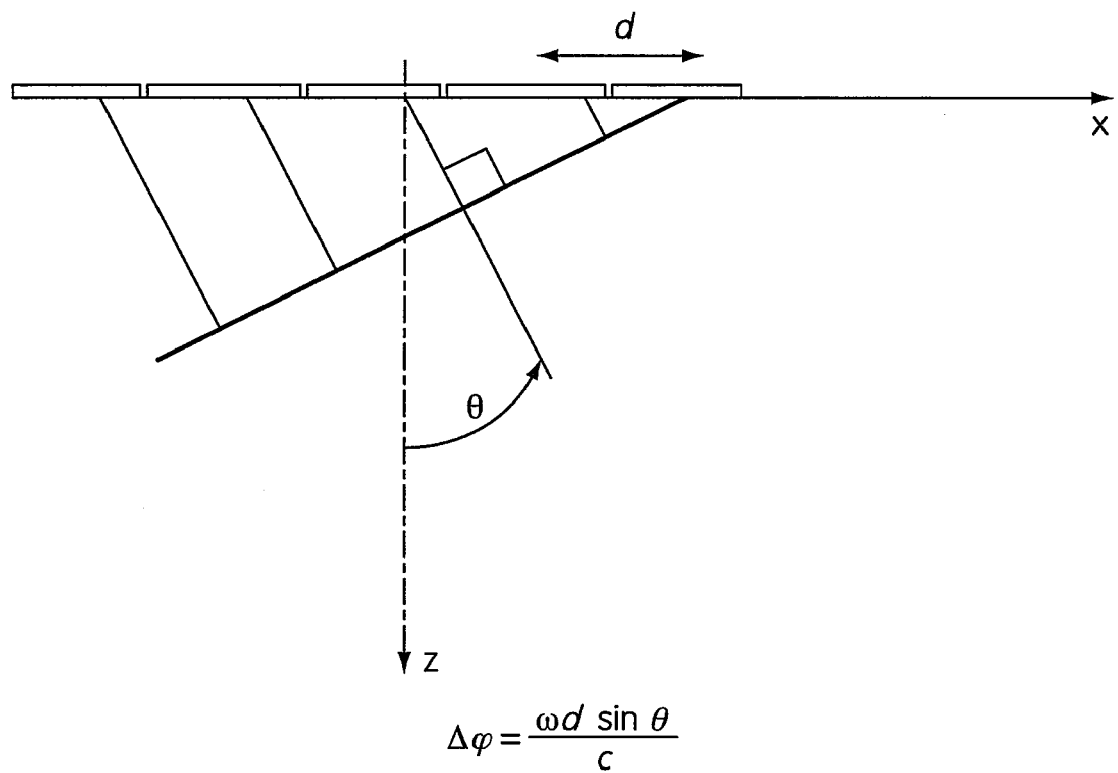
FIG. 5 is a schematic illustration of a transducer array along with the definition of the phase shift $\Delta\phi$ and the angle of steering $\theta$.

FIG. 5 shows a schematic array along with the definition of the phase shift $\Delta\phi$ and the angle of steering $\theta$:

$$\Delta\varphi = \frac{\omega d}{c}\sin\theta, \quad (8)$$

where $\omega$ is the frequency of the primary, $f_1$ or $f_2$ that is to be steered, d is the distance between the sources and c is the P-wave velocity of the formation. In the illustration, the primary sources having the frequency of $f_1$ and $f_2$ alternate along the x-axis and the steering angle $\theta$ is measured away from the z-axis and towards the x-axis, wherein the x-axis and the z-axis are mutually perpendicular.

Figure 6:
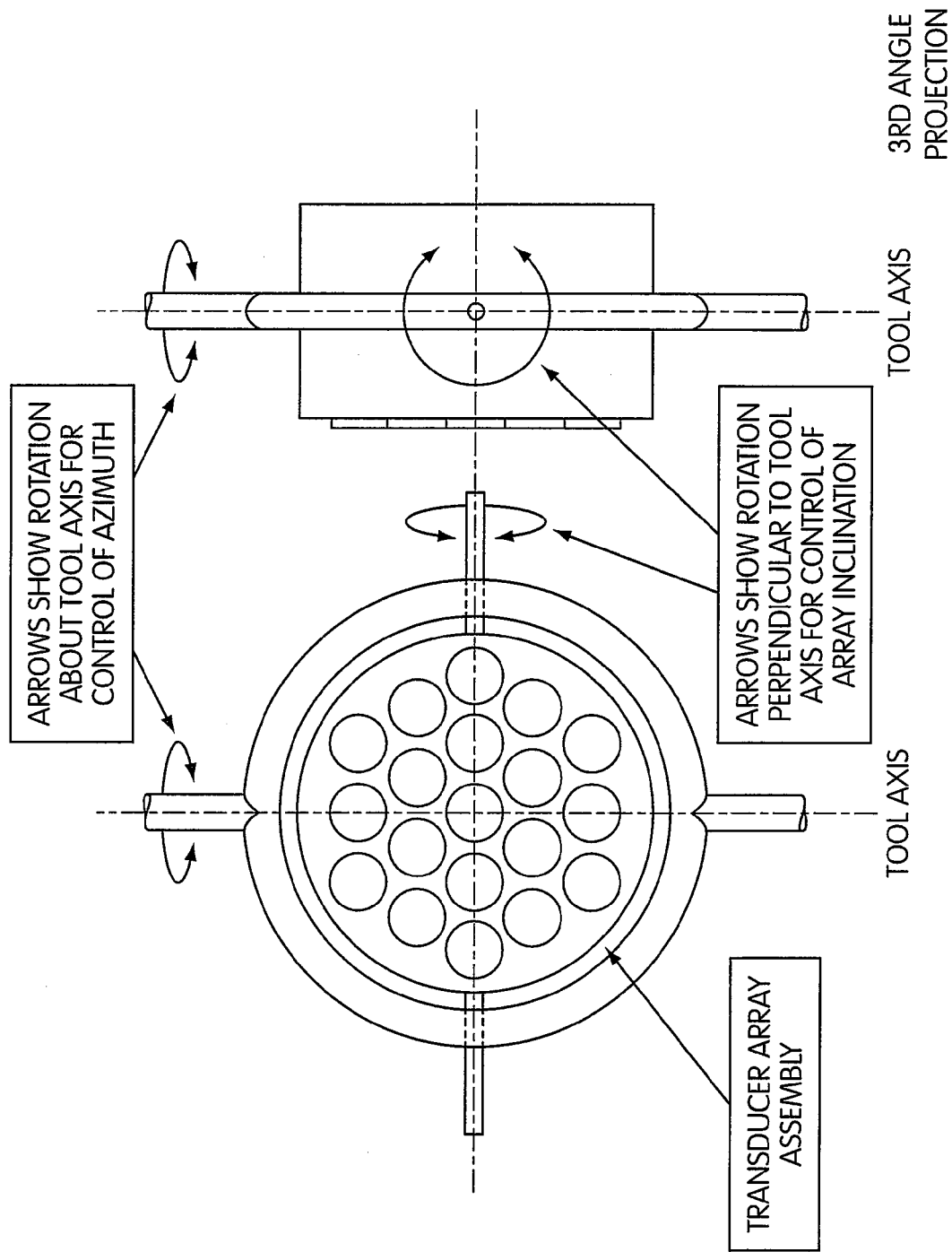
FIG. 6 is a schematic illustration illustrating an example of how control of the azimuth and inclination of the plane of the array may be achieved by rotation around the borehole axis, and rocking in a plane perpendicular to the borehole axis.

In some embodiments, the direction of the beam is steered by selectively controlling the azimuth of the array by rotation around the tool axis, and the inclination, the angle between the plane of the front of the array and the tool axis. The corresponding axes of rotation are illustrated in FIG. 6. By use of actuators (not shown) the plane of the array can be effectively controlled in azimuth and inclination. The actuators can thus be used to steering or changing the direction of the primary frequencies $f_1$ and $f_2$.

Figure 7:
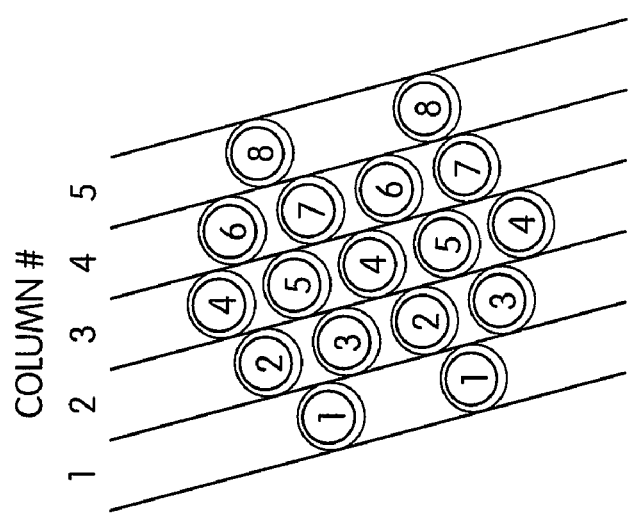
FIG. 7 shows the distribution of the sources of the array used for the experimental set-up in FIGS. 2, 3, 4 and 8.

In some embodiments, the inclination of the primary signals $f_1$ and $f_2$ is achieved by controlling the relative phase of some of the elements in the source array, noting that the third signal within the formation will inherit the direction of the primaries. An example of such control realized in the laboratory is shown in FIG. 7. By way of a non-limiting example, the array used in the laboratory was divided into five regions or several arrays referred to as "columns". In column 1, two transducers are shown both labeled "1" that are configured to produce a frequency of $f_1$ without any phase delay. In column 2, four transducers are shown wherein the transducers labeled "2" are configured to produce frequency $f_1$ having been offset by a phase of $\Delta\phi$ and the transducers labeled "3" are configured to produce a frequency $f_2$ having a zero phase offset. In column 3, five transducers are shown wherein the transducers labeled "4" are configured to produce frequency $f_1$ having been offset by a phase of $2\Delta\phi$ and the transducers labeled "5" are configured to produce a frequency $f_2$ having been offset by a phase of $\Delta\phi$. In column 4, four transducers are shown wherein the transducers labeled "6" are configured to produce frequency $f_1$ having been offset by a phase of $3\Delta\phi$ and the transducers labeled "7" are configured to produce a frequency $f_2$ having been offset by a phase of $2\Delta\phi$. In column 5, two transducers are shown wherein the transducers labeled "8"

are configured to produce a frequency $f_2$ having been offset by a phase of $3\Delta\phi$. In the laboratory demonstration, the phase difference between each of these "columns" chosen to steer the primaries 15 degrees from the perpendicular to the plane of the transducers. In this non-limiting example, the transducers were attached to the sandstone block as shown in FIG. 2. Other configurations are also possible without diverting from the scope of invention. For example, more or fewer transducers may be used, the transducers may be arranged in alternative patterns, and the relative phase of the signals may differ considerably from the example described, so long as phase differences among the primary acoustic signals result in steering or control of their direction of propagation.

Figure 8A:
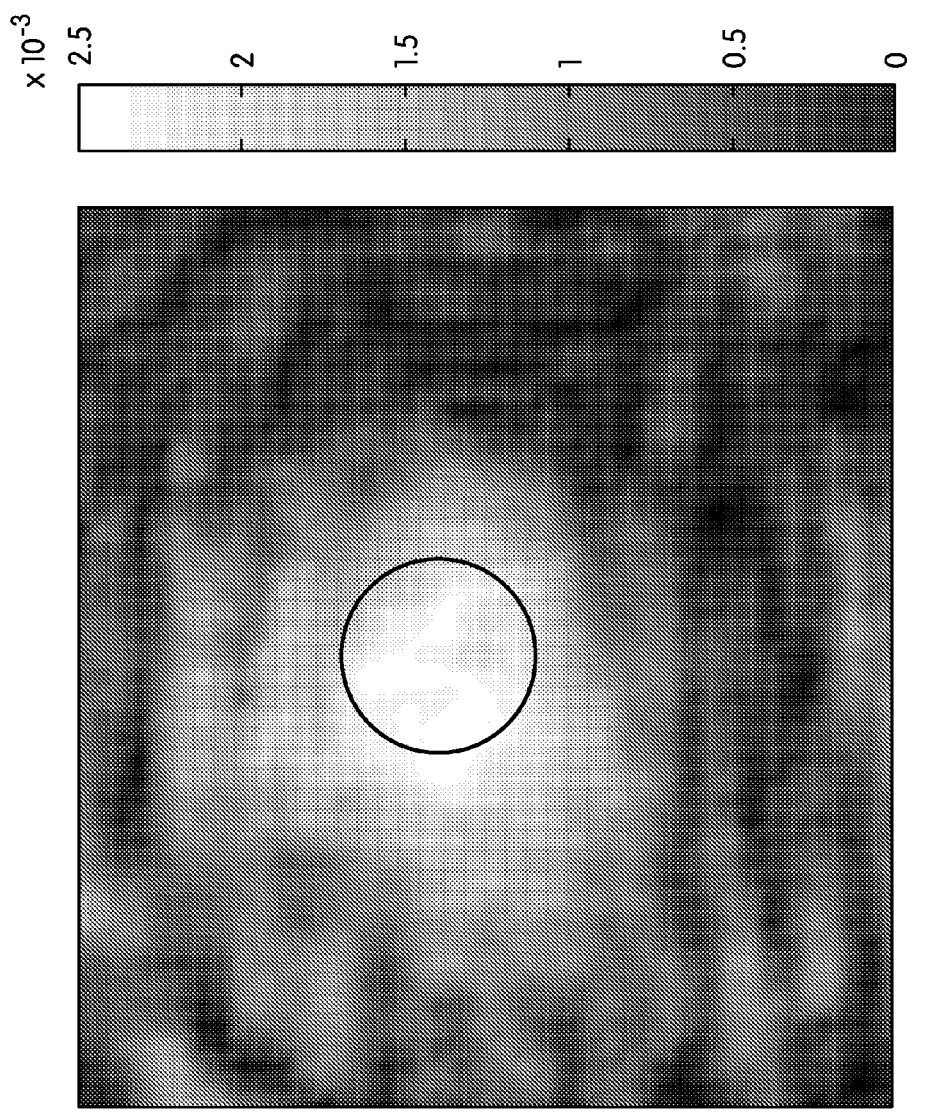
FIGS. 8a and 8b shows experimental results obtained from the distribution of sources in the transducer array of FIG. 7, showing that the 5 kHz difference frequency beam can be steered by steering the primary beams. The black circle indicates the position of the transducer array on the opposite side of the sandstone block.
Figure 8A:
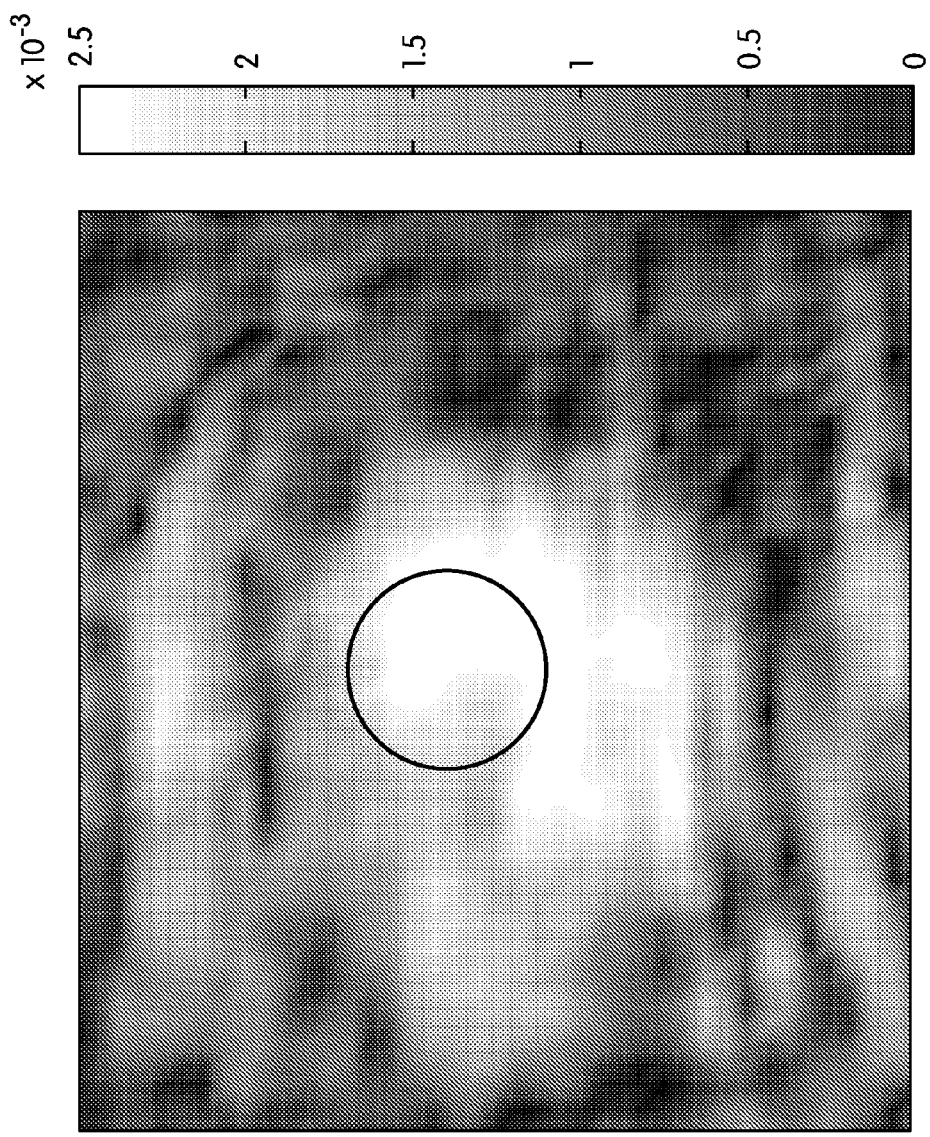
Figure 8A:
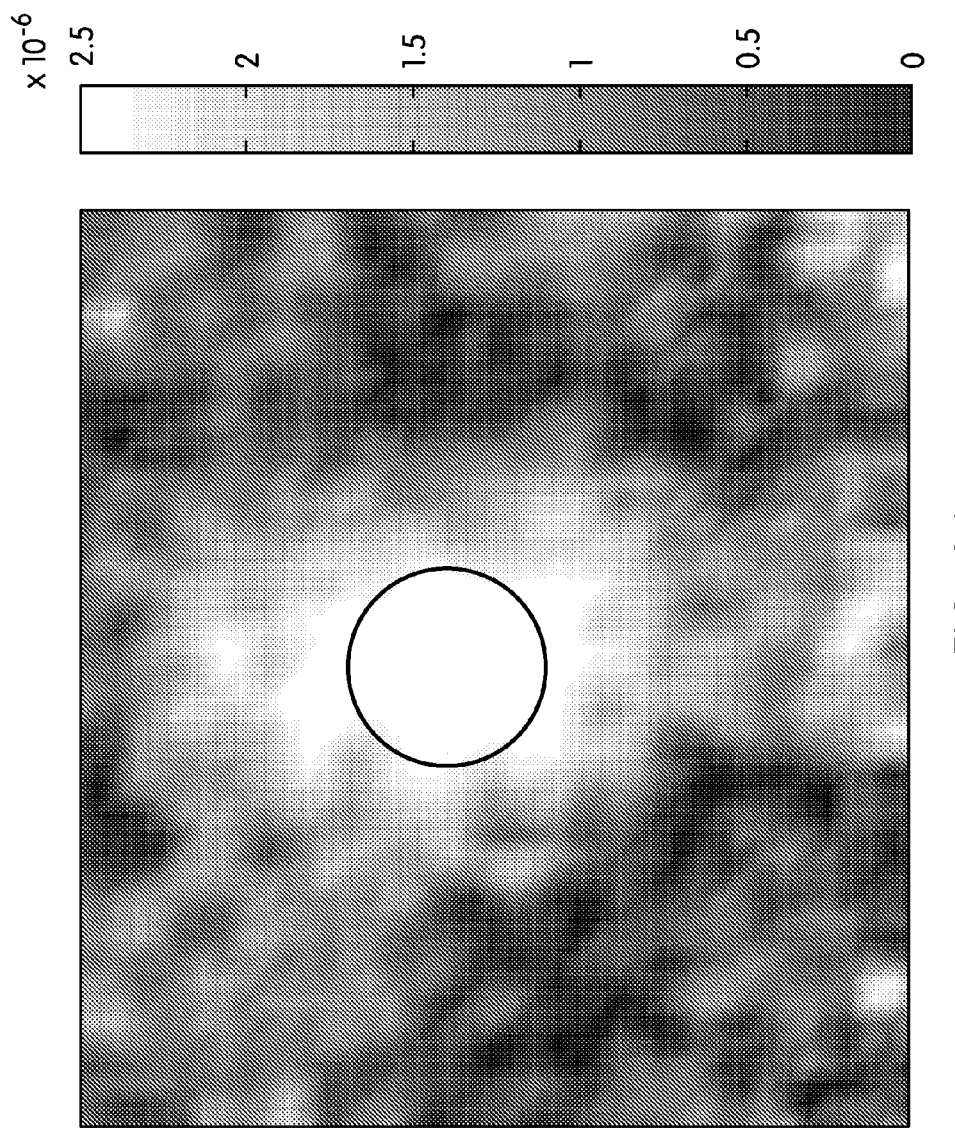
Figure 8B:
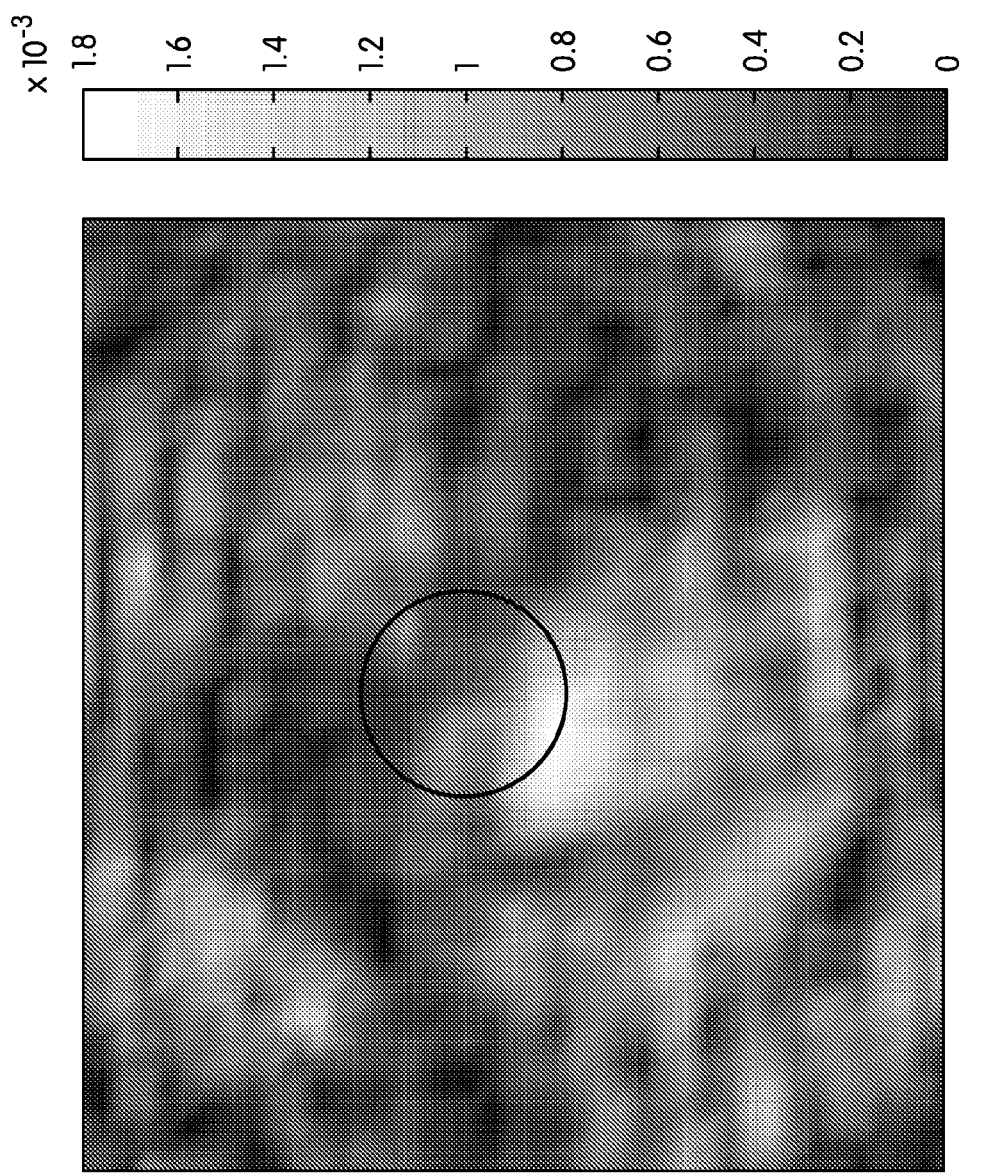
Figure 8B:
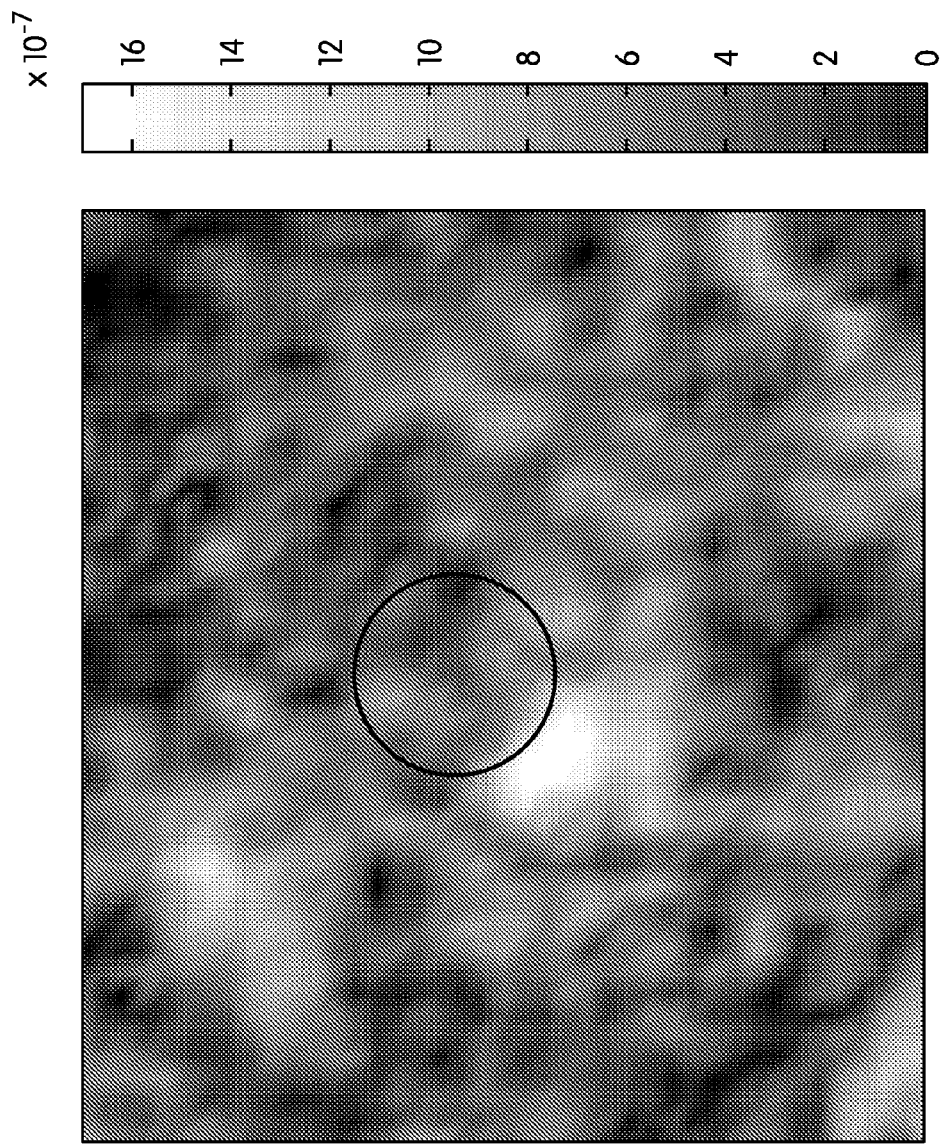

FIG. 8a shows the experimental results obtained with no steering (in which case no phase shift is applied between the "columns") while FIG. 8b shows the results when steering is applied for the set-up shown in FIG. 7. As is shown in FIG. 8a, a set of transducers operating at a frequency of 60 kHz and a second set operating at 65 kHz, neither of which has any phase offset applied to their respective transducers, produces a third signal with a frequency of $f_2-f_1=5$ kHz that is focused as indicated by the circle. In contrast, when steering is applied by using the phase control described in relation to FIG. 7, the location of each of the first and the second frequencies, as well as, the difference signal, are offset from the center of the array on the opposite face of the sandstone block indicated by the circle in the figure.

In some embodiments, the third signal is encoded with a time-varying code, which can be introduced into either the first or the second signal, or both. The time-varying code may include one or more of a variation in amplitude, a variation in frequency, and/or a variation in phase of the first, the second, or both the first and the second signals. The received time-varying code of the third signal can be used to measure a time-of-flight of the third signal. Additionally, in some embodiments, the collimated difference beam can be broad band if one of the primary frequencies is swept through a range of frequencies while the other is fixed on a particular frequency. Thus, the resulting third beam $f_2-f_1$ will be swept across a wide frequency range.

Figure 9B:
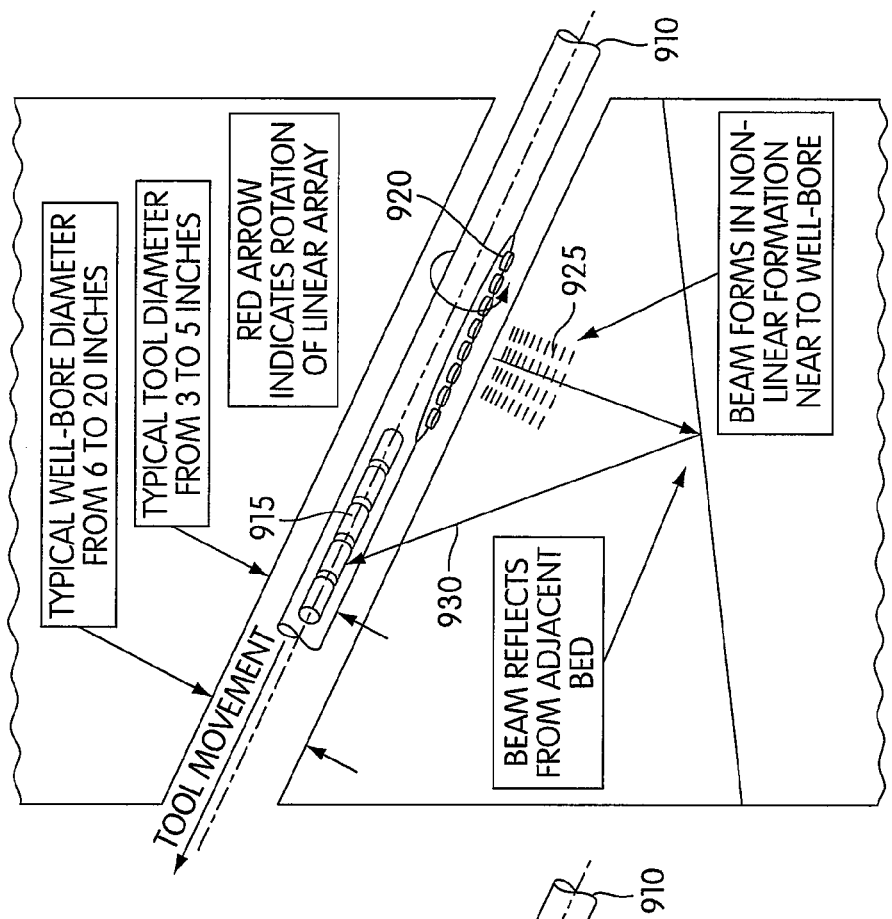
FIGS. 9a and 9b show an aspect of an embodiment useable to create images, including three-dimensional images, around the borehole.
Figure 9A:
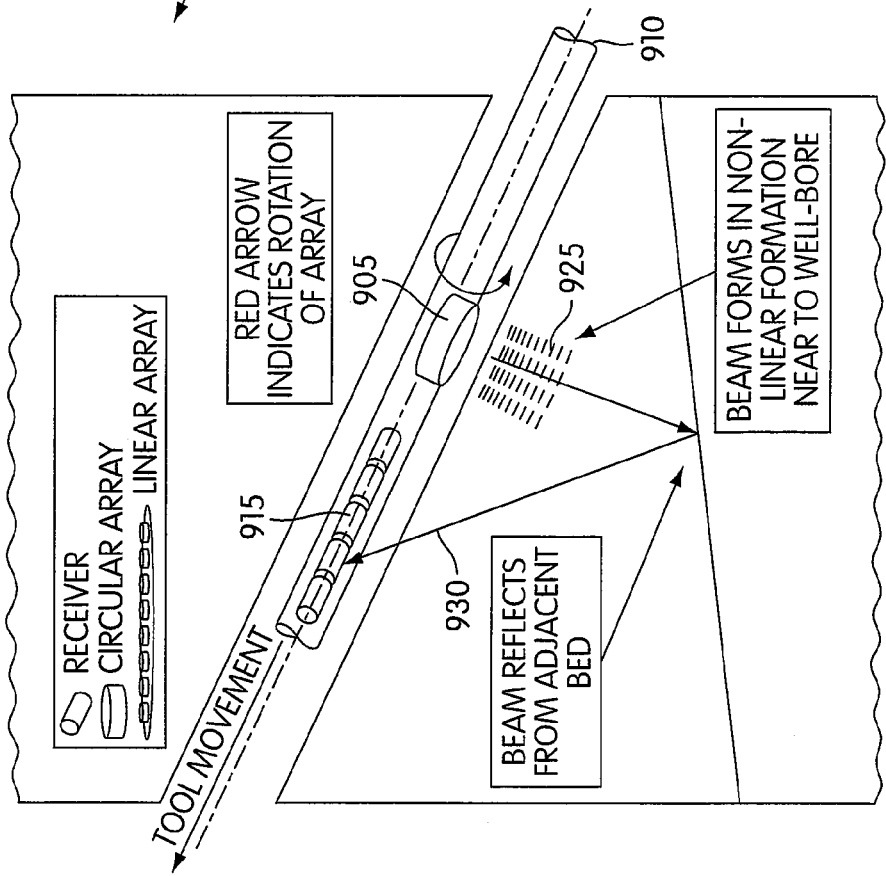

FIGS. 9a and 9b show an aspect of the invention used to create images, including three-dimensional images, around the borehole. The collimated difference beam ($f_2-f_1$) generated by the method described in this invention is suitable for creating an image of the rock formation and the wellbore. The difference beam can be aimed in a particular direction to investigate a particular region of the rock formation. Inhomogeneities of the formations localized along the beam will generate reflection, linear or scattering of the seismic waves. The reflected and scattered waves are recorded by receivers arrays in the same borehole (for the case of single well imaging). FIGS. 9a and 9b illustrate examples of the many possible measurement and tool configurations.

In FIG. 9a, an array of transducers is arranged on a circular array 905 with a borehole 910. Two primary frequencies $f_1$ and $f_2$ are produced by the array and mix in a non-linear region outside the wellbore 925 to produce the difference frequency $f_3$. The difference frequency beam is reflected or scattered from an adjacent bed or other body and this reflected beam 930 is received by the receivers 915 in the borehole 910. The array on the circular array 905 including the receivers 915 can be moved up and down the length of the borehole to image a particular formation near the borehole. Moreover, the array can be rotated around the axis of the borehole to image formation in any direction around the borehole. FIG. 9b shows an alternative linear array configuration 920. FIG. 9b is similar to FIG. 9a, but shows a linear array configured along the axis of the borehole. Either array may be rotated around the tool axis to achieve imaging of formations around the borehole.

The recordings of received waveforms are processed to generate an image of the reflection or transmission characteristics of the formation. The directivity of the beam and the time of flight may fix the locations where scattered waves are generated, distinguishing this device from normal sonic imaging techniques using conventional non-directional monopole and dipole sources. An associated effect of using a beam compared with conventional sources is that the computation of an image of formation acoustic properties may not require a detailed specification of a velocity field for the rock formation. The directivity of the beam and the time of flight measurement simplify and improve the ability to identify the location where the waves are reflected or scattered. In particular, the directivity of the array beam source localizes the sources of recorded scattered wave along the beam direction and the time delay localizes the position of the scattered source along the beam path. Thus the borehole imaging with a beam source presents a simplification and reduction in uncertainty of the final image in contrast to conventional (not beam) sources which require an accurate detailed velocity model for focusing computation of the 3D image. Furthermore, because the beam is focused and steerable, the array beam has azimuthal and inclination directivity with respect to the borehole, and the imaging would tend to have higher resolution than a conventional source with little directivity and consequent ambiguity as to the origin of the reflection. The anticipated difference beam frequency for the invention ranges from 500 Hz to 10 kHz. The low frequency part of the range is at the very low end of the range used by conventional sonic logging tools, which implies a greater depth of penetration, up to several hundreds of feet, due to less attenuation. It is important to note that, since the beam is being generated in the formation outside the borehole, this low frequency beam generation mechanism will not lead to the generation of borehole modes, such as the Stoneley wave, that capture a large part of the energy generated in the borehole by conventional sources. Moreover, the backscatter of acoustic energy can be used to image around the borehole by rotation in azimuth and inclination, and linear movement of the array 920 along the borehole.

Figure 10:
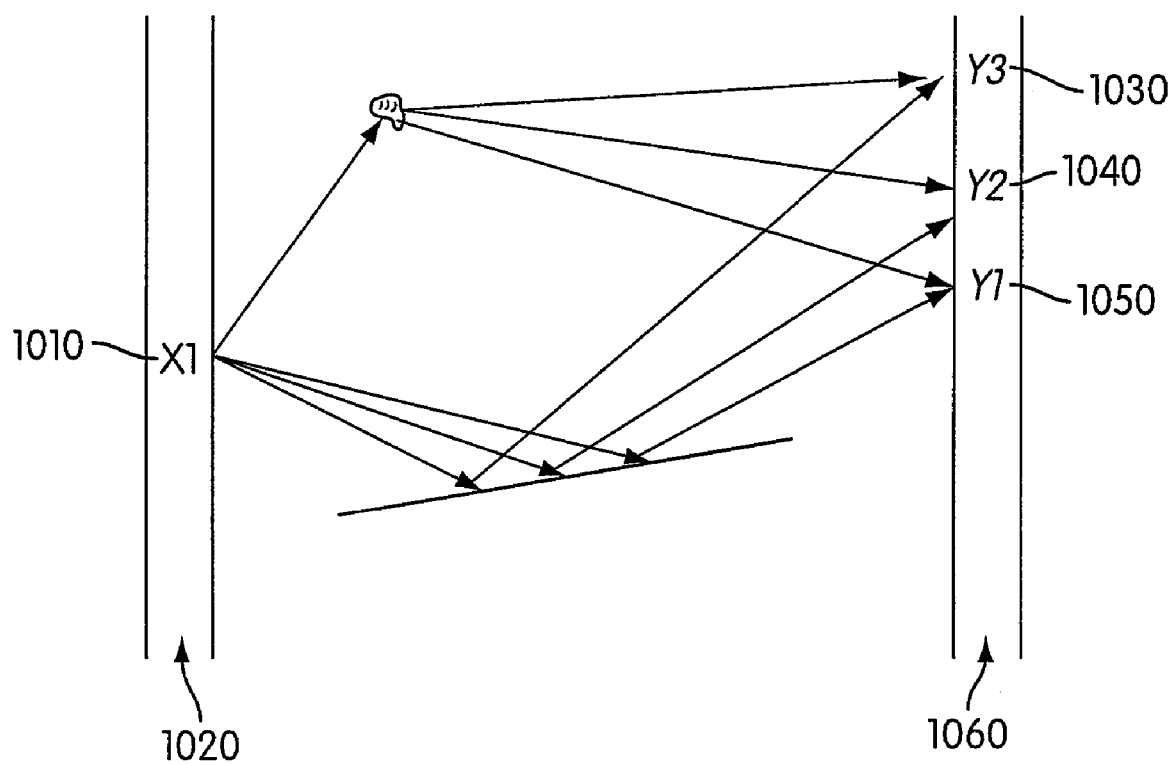
FIG. 10 shows an aspect of an embodiment for performing cross-well tomography.

FIG. 10 shows an aspect of the invention for performing cross-well tomography. The frequency range of 500 Hz to 10 kHz, with a range of investigation of several hundreds of feet from the borehole, can be applied in a cross-well imaging and tomography application. Furthermore, the beam nature of the source permits distinct processing methodologies for cross-well imaging and cross-well tomography that differ from approaches using non-focused sources. In this aspect, the beam source 1010 is generated from one borehole 1020 and detected with receivers 1030, 1040, 1050 in a second borehole 1060. In cross-well tomography, the travel times and amplitudes of direct arrivals between various source and receivers between wells are processed with various tomography inversion methods to obtain a cross-section of velocity and attenuation strength of the rock formation between the wells. With a steerable parametric beam source, the beam can be scanned and detected by an array of detector $Y_1, Y_2, Y_3$ etc. in the second borehole. In this configuration, the maximum signal would systematically sweep sequentially across the receivers making the detection of the direct arrival easier and more robust.

Figure 11A:
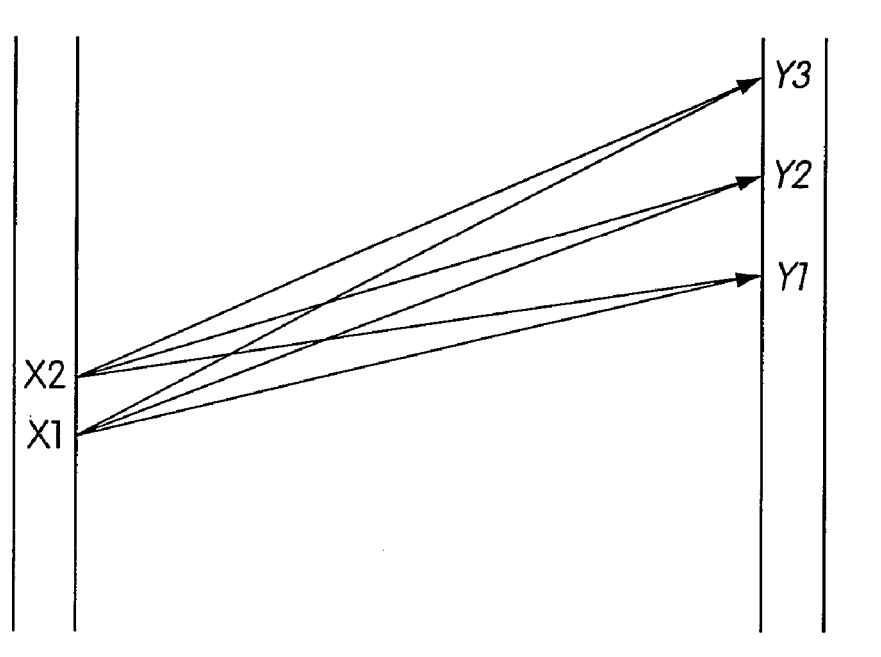
FIGS. 11a and 11b show an aspect of an embodiment wherein the source in the first borehole is moved axially and received at a plurality of locations within a second borehole in a configuration designed for cross-well formation property and bedding interpretation.
Figure 11B:
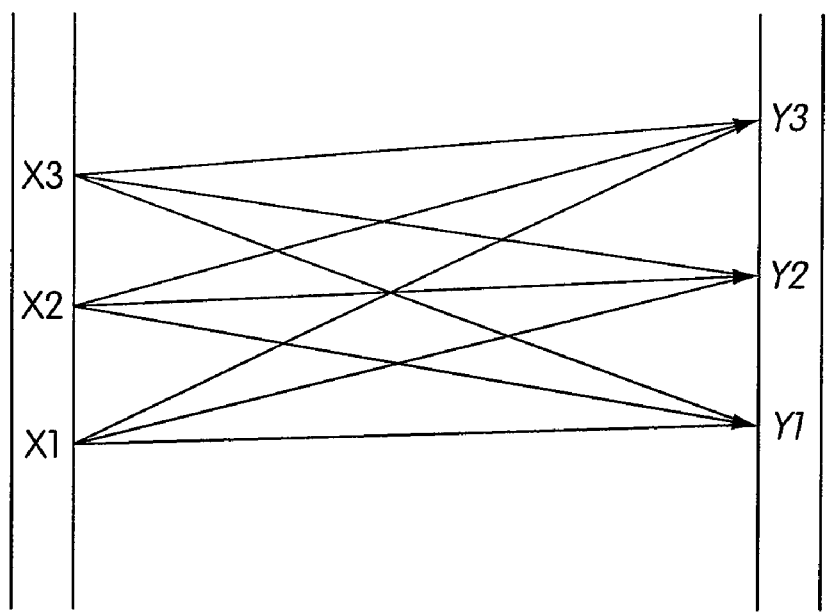

FIGS. 11a and 11b show an aspect of the invention wherein the source in the first borehole is moved axially and received at a plurality of locations within a second borehole. In this aspect, the parametric array beam source generated by mixing within the rocks around the borehole can be configured in tools to measure and create a log of the non-linear properties of the near wellbore region where three wave mixing occurs. In this configuration, the parametric array beam is generated from a location $X_1$ in one borehole and steered toward many receivers at location $Y_j$ in a second borehole. Let the measured signal be $M(X_i, Y_j)$. The source is moved up hole to a location $X_2$ and similar data are collected to give a measured signal of $M(X_2, Y_j)$. From Equation (4), it is evident that the sum over many $Y_j$ of the ratio of $M(X_1, Y_j)/M(X_2, Y_j)$ would be proportional to the ratio $\beta(X_1)/\beta(X_2)$, where $\beta$ are non-linear properties within a mixing distance (a few feet) of the source borehole. By repeating the measurements over many locations $X_i$, a log of relative strengths of non-linear properties close to the source borehole and within a chosen depth interval can be obtained from Equation (4) as a weighted average of a signal ratio such as the formula $$\frac{\beta(X_1)}{\beta(X_2)} = \sum_i \frac{\text{Measured Signal}(X_1, Y_i)}{\text{Measured Signal}(X_2, Y_i)} \times \text{Weight}(Y_i) \quad (9)$$

It is understood that the above relation applies to the signal whose dominant frequency is the difference frequency, i.e. $(f_2 - f_1)$. Another relative measurement of the non-linearity of the formation near the borehole can be made by taking the amplitude ratio of the received signal at the frequency $(f_2 - f_1)$ to the one emitted at the source.

If there are strong reflections surrounding a borehole, the source can be configured in tools to measure and create a log of non-linear properties very close to the borehole. Because the statistical distribution of the reflection strengths of the earth, the earth reflectivity response would be a slowly varying function of the source location while the non-linear properties of the rock just around the borehole would vary more rapidly with respect to source location. Therefore, using a single well, a high spatial frequency log of the $\beta$ function can be also generated using equation (9).

Figure 12:
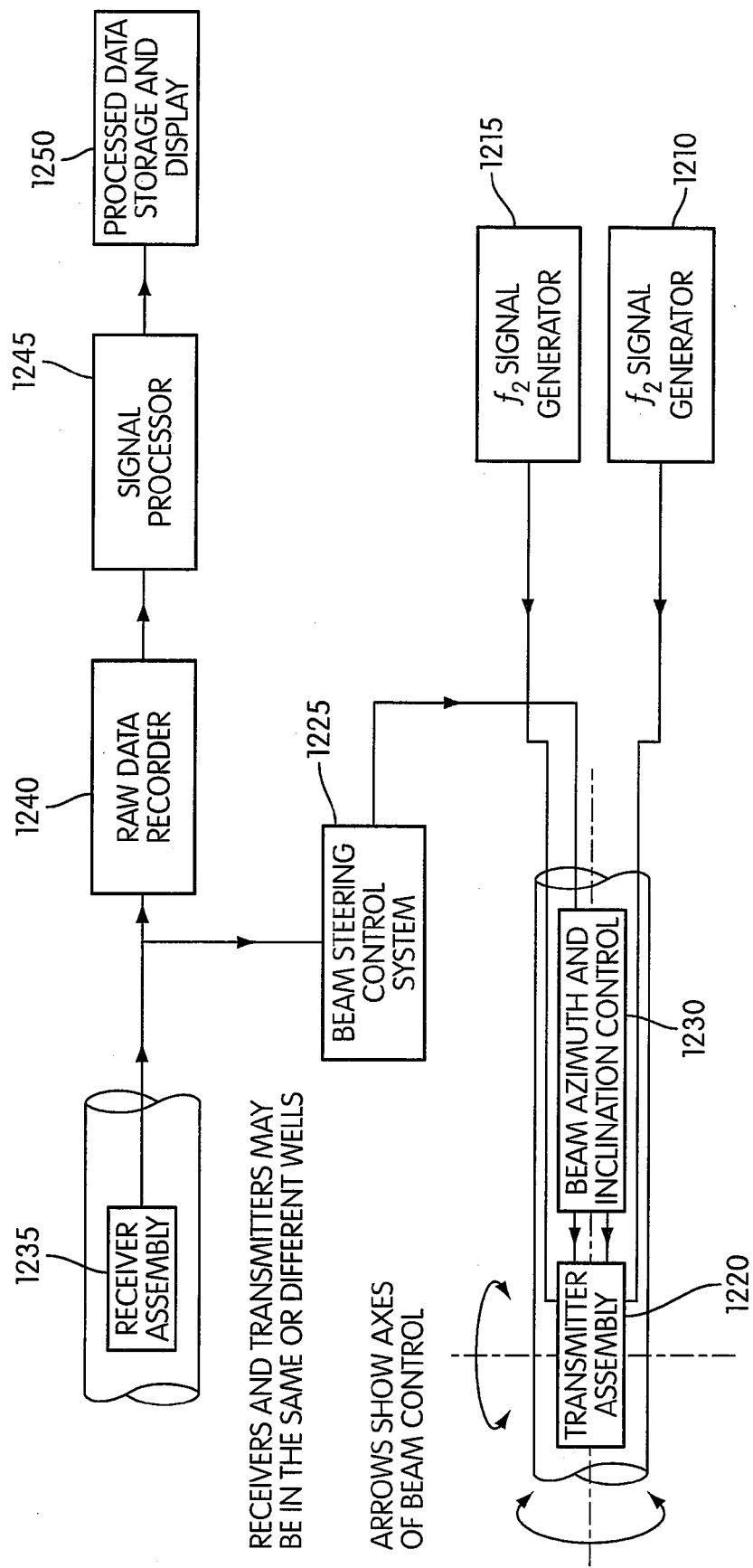
FIG. 12 shows system components for producing the third signal in accordance with an embodiment of the invention.

FIG. 12 shows system components for producing the third signal. A first generator 1210 configured to generate a first acoustic signal at a frequency $f_1$ and a second generator 1215 configured to generate a second acoustic signal at a frequency $f_2$ are coupled to a transducer assembly 1220 arranged within a borehole. A beam steering control system 1225 and a beam azimuth and inclination control mechanism 1230 are coupled to the transducer assembly 1220 and are configured to steer the first, the second, and/or both the first and the second signals. The azimuth and inclination control mechanism 1230 can be configured to steer by either modulating the phase of the first, the second, and/or both the first and the second signals or activating actuators on the transducer assembly to effect control of the beams. A receiver assembly 1235 can be located in either the borehole containing the transducer assembly 1220 or in another borehole. The receiver assembly 1235 includes one or more receivers configured to receive the third signal. The received third signal can be stored in a raw data recorder 1240 and processed using a signal processor 1245. The processed data can be stored and displayed by a computer 1250. The receiver assembly can be connected to the data recorder 1240 and signal processor 1245 though a wired or wireless connection. The computer 1250 can include machine readable instruction configured to process and manipulate the processed date as would be apparent.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, though reference is made herein to a computer, this may include a general purpose computer, a purpose-built computer, an ASIC including machine executable instructions and programmed to execute the methods, a computer array or network, or other appropriate computing device. As shown in FIG. 12, the data collected by the receivers would undergo some processing and are either stored in memory in the tool, or transmitted up hole for further processing and storage. As a further example, it is to be understood that the present invention contemplates that, to the extent possible, one or more features of any embodiment can be combined with one or more features of any other embodiment.

What is claimed is:

1. A system for determining information about a rock formation penetrated by a borehole, the system comprising:
   a first plurality of transducers configured to generate a first acoustic beam signal at a first frequency and a second plurality of transducers configured to generate a second acoustic beam signal at a second frequency different from the first frequency, the first plurality of transducers and the second plurality of transducers being intermingled so that the first acoustic beam signal and the second acoustic beam signal are substantially collinear, the first acoustic beam signal and the second acoustic beam signal are arranged for collinear mixing in a volume of rock outside the borehole in order to generate a collimated third acoustic beam in the rock formation propagating in a same direction as a direction of the first and second acoustic beams beyond the mixing volume at a frequency substantially equal to a difference between the first frequency and the second frequency, wherein the frequency of the collimated third acoustic beam is between about 500 Hz and about 10 kHz;
   a controller configured to control a direction of the first acoustic beam signal, the second acoustic beam signal or both by controlling a relative phase between the first plurality of transducers and a relative phase between the second plurality of transducers;
   one or more receivers disposed in the borehole configured to detect a resultant signal that results from the interaction of the collimated third acoustic beam with inhomogeneities in the rock formation as the collimated third acoustic beam propagates through the rock formation; and
   a processor programmable with machine executable instructions for analyzing the resultant signal to determine information about the rock formation.

2. The system in accordance with claim 1, wherein the processor is further programmable with machine executable instructions for producing an image of the rock formation.

3. The system in accordance with claim 1, wherein the first plurality of transducers and the second plurality of transducers are configured in an array.

4. The system in accordance with claim 1, wherein the resultant signal is received by the one or more receivers by transmission, reflection or backscattering.

5. The system in accordance with claim 1, wherein the first plurality of transducers and the second plurality of transducers are configured to rotate azimuthally about a longitudinal axis of the borehole such that an azimuth of the collimated third acoustic beam is rotated azimuthally when the first plurality of transducers and the second plurality of transducers are rotated.

6. The system in accordance with claim 1, wherein the controller is further configured to control one or more actuators to change an inclination of the first plurality of transducers and the second plurality of transducers so as to change an inclination of the collimated third acoustic beam.

7. The system in accordance with claim 1, further comprising an encoder configured to encode a time-varying code by introducing a time-varying component including one or more of chirping or frequency sweep to one of the first and the second acoustic beam signals.

8. The system in accordance with claim 7, wherein the time-varying components comprise a variation in amplitude, frequency, and/or phase.

9. The system in accordance with claim 1, wherein the controller is configured to use feedback based on one or more properties of the resultant signal received at the one or more receivers to orient the first and second acoustic beam signals to maximize a signal strength of the resultant signal.

10. The system in accordance with claim 1, wherein the first plurality of transducers and the second plurality of transducers are configured to deliver compressional or shear energy to the formation surrounding the borehole.

11. A system for characterizing linear and non-linear properties of a rock formation penetrated by a first borehole and a second borehole, the system comprising:
a first plurality of transducers configured to generate a first acoustic beam signal at a first frequency and a second plurality of transducers configured to generate a second acoustic beam signal at a second frequency different from the first frequency, the first plurality of transducers and the second plurality of transducers being intermingled so that the first acoustic beam signal and the second acoustic beam signal are substantially collinear, the first acoustic beam signal and the second acoustic beam signal are arranged for collinear mixing in a volume of rock outside the first borehole in order to generate a collimated third acoustic beam in the rock formation propagating in a same direction as a direction of the first and second acoustic beams beyond the mixing volume at a frequency substantially equal to a difference between the first frequency and the second frequency, wherein the frequency of the collimated third acoustic beam is between about 500 Hz and about 10 kHz;
a controller configured to control a direction of the first acoustic beam signal, the second acoustic beam signal or both by controlling a relative phase between the first plurality of transducers and a relative phase between the second plurality of transducers;
one or more receivers arranged in the second borehole and configured to detect a resultant signal that results from the interaction of the collimated third acoustic beam with inhomogeneities in the rock formation as the collimated third acoustic beam propagates through the rock formation; and
a processor programmable with machine executable instructions for analyzing the resultant signal to determine information about the rock formation between the first and the second boreholes.

12. The system in accordance with claim 11, wherein the processor is further programmable with machine executable instructions for producing an image of the rock formation between the first and the second boreholes.

13. The system in accordance with claim 11, wherein the first plurality of transducers and the second plurality of transducers are configured in an array.

14. The system in accordance with claim 13, wherein the first plurality of transducers and the second plurality of transducers are configured such that an azimuth of the collimated third acoustic beam is rotated about a longitudinal axis of the borehole.

15. The system in accordance with claim 11, further comprising another one or more receivers arranged in the first borehole, said another one or more receivers being configured to detect the resultant signal that results from the interaction of the collimated third acoustic beam with inhomogeneities in the rock formation as the collimated third acoustic beam propagates through the rock formation.

16. The system in accordance with claim 11, wherein the controller is further configured to control an inclination of acoustic energy transmitted by the first plurality of transducers and the second plurality of transducers.

17. The system in accordance with claim 11, further comprising an encoder configured to encode a time-varying code by introducing a time-varying component including one or more of chirping or frequency sweep to one of the first and the second acoustic beam signals.

18. The system in accordance with claim 17, wherein the time-varying components comprise a variation in amplitude, frequency, and/or phase.

19. The system in accordance with claim 11, further comprising a controller configured to use feedback based on one or more properties of the resultant signal received at the one or more receivers to orient the first and second acoustic beam signals to maximize a signal strength of the resultant signal.

* * * * *